March 26, 1963

C. L. ELLIS 3,082,834

WEIGHING DEVICE

Filed Sept. 30, 1958

INVENTOR.
CHARLES L. ELLIS
BY
*Kenneth C. Witt*
ATTY.

INVENTOR.
CHARLES L. ELLIS
BY
ATTY.

*INVENTOR.*
CHARLES L. ELLIS
BY Kenneth C. Witt,
ATTY.

March 26, 1963   C. L. ELLIS   3,082,834
WEIGHING DEVICE
Filed Sept. 30, 1958   5 Sheets-Sheet 5
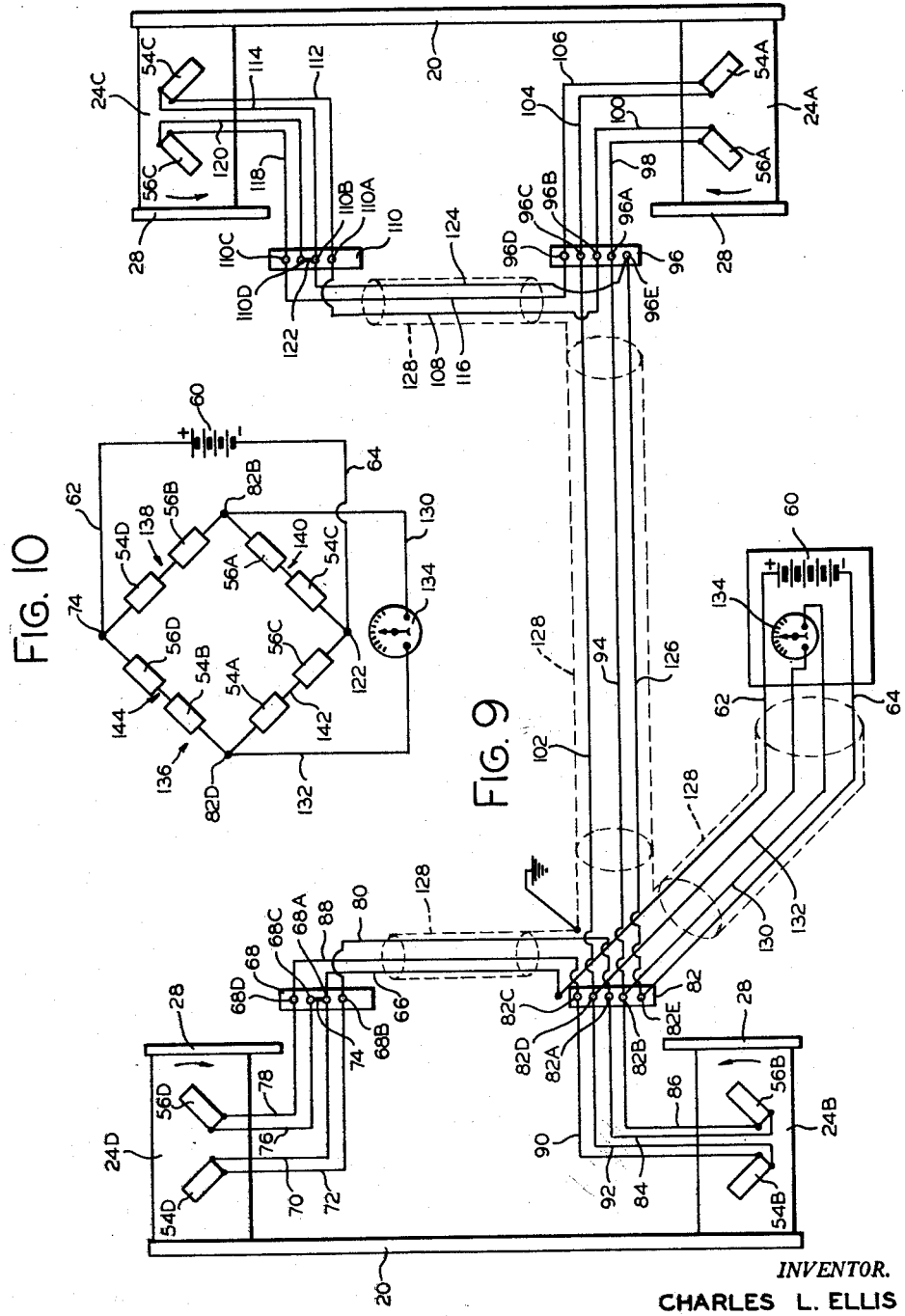
INVENTOR.
CHARLES L. ELLIS
BY Kenneth C. Witt
ATTY.

United States Patent Office 3,082,834
Patented Mar. 26, 1963

3,082,834
WEIGHING DEVICE
Charles L. Ellis, St. Joseph, Mich., assignor to Clark Equipment Company, a corporation of Michigan
Filed Sept. 30, 1958, Ser. No. 764,406
9 Claims. (Cl. 177—134)

This invention relates to weighing devices and more particularly to a platform scale for weighing relatively heavy loads such as motor vehicles and the like. Still more particularly the invention relates to a portable platform scale which is capable of weighing a vehicle and its load by weighing an entire axle load of a vehicle at one time whereby rapid and accurate weights of the materials being hauled by the vehicle may be obtained.

Scale units for weighing vehicles and their loads have been known for some time. Such units usually have been either single wheel or single axle units because of the very large size and high cost of a scale capable of weighing all wheels of a large vehicle simultaneously. The single wheel type of scale which has been utilized for weighing a vehicle and its load one wheel at a time has not been satisfactory because of a number of inherent disadvantages. It has been found, for example, that single wheel scales can be made to give readings varying up to 50 percent simply by applying pressure to the steering wheel or to the brakes of the vehicle while it is on the scale. In addition, it is sometimes difficult to position the wheel on the scale. Furthermore, the weighing operation takes too long because of the fact that it is necessary to take at least four readings which must be added and then the deadweight of the haul unit subtracted from the total to arrive at the actual weight of the material being hauled.

The full axle units of the prior art have avoided some of the disadvantages of the single wheel units, but, they have not been readily adaptable for portable operation. They have been large in size and very heavy so that it has not been possible ordinarily to transport them for convenient use in various temporary locations where reweighing at the site of loading operations would be more advantageous, time saving, and economical.

Heretofore, platform scales usually have been provided with leverage systems involving knife edge supports which require extreme accuracy, and such construction is expensive to produce and causes difficulty if it is attempted to transport the scale. Prior art types of platform scales, whether of the single wheel or full-axle type, also have been of such character as to require that the platform be so supported on the scale levers that it may have substantial freedom of motion whenever a load is placed thereon in order that excessive strain on the scale elements be avoided. Furthermore, it has also been essential in many cases, in order that a correct weighing of the load be obtained, that the lever mechanism of the prior art scales be maintained in alignment regardless of movement of the scale platform. Such requirements have contributed to the large over-all size and weight of the units so as to render them impractical for portable use. It has further been essential in the installation of most such scales to assure that the platforms thereof are absolutely level in order to obtain accurate readings which further renders such scales impractical for portable use in jobs where the terrain is not level thereby requiring additional time in setting up the scales on the site.

In general, the structure of the present invention comprises a frame, and a weighing platform which is adapted to receive an entire axle of a vehicle. When the weight is on the platform, the platform pushes down on levers attached to torsion members. The torsion members twist a certain amount and deform strain gages secured thereon. The levers and strain gages are adapted and arranged so as to be self-compensating for tilt and lateral movement of the weighing platform. The strain gages may be connected in the arms of an electrical bridge circuit, which is responsive to the relative resistances in the various strain gages and thereby is responsive to torsional strain variations in the torsional members. The load on the weighing platform thus produces a torsional strain of the torsion members and strain gages which upsets the balance of the bridge circuit and produces a current responsive to the load which may be utilized to operate an instrument calibrated to give a direct reading of the weight of the load on the platform.

With the foregoing in mind, it is a primary object of the present invention to provide a weighing scale having a novel structure and arrangement of parts to minimize the size and weight thereof so as to render the scale practical for portable use.

It is a further object of the present invention to provide a portable weighing scale with a frame and platform structure of minimum depth whereby, if desired, the scale may be utilized for weighing vehicles without requiring the scale to be installed below the grade level over which the vehicles may be travelling.

It is a still further object of the present invention to provide a portable weighing scale having a weighing platform supported from the frame by a plurality of torsion members.

It is a still further object of the present invention to provide a portable weighing device which does not require precise leveling and which incorporates means for automatically compensating for tilt of the weighing platform.

It is a still further object of the present invention to provide a portable weighing apparatus which is adapted and arranged for field weighing of heavy loads and which may be used under adverse weather conditions without impairing the accuracy thereof.

It is a still further object of the present invention to provide a portable weighing device which is economical to manufacture, is rugged and dependable in service, requires a minimum of maintenance, and which gives rapid and accurate weight measurements.

The above and other objects and advantages of the present invention will become apparent from the following detailed description of an illustrative embodiment thereof, reference being had to the accompanying drawing forming a part hereof and wherein.

Figure 6:
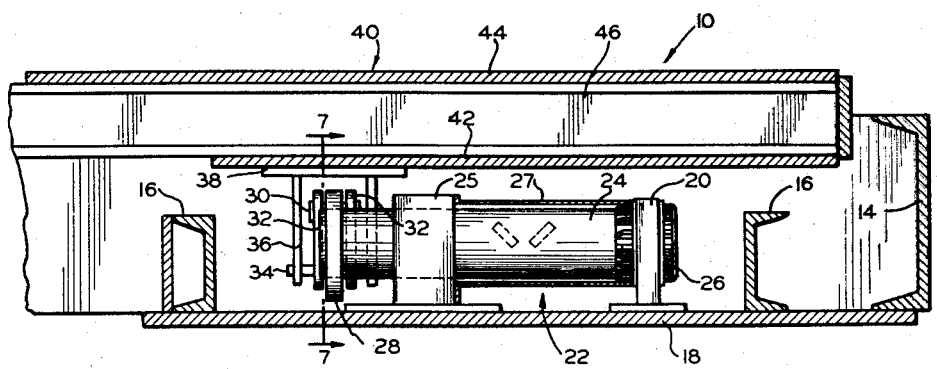
FIGURE 6 is an enlarged fragmentary cross-section taken substantially along the line 6—6 of FIGURE 2 and illustrates in more detail the construction and general arrangement of the torque transmitting linkage and its connection between the weighing platform and the torsional members.
Figure 7:
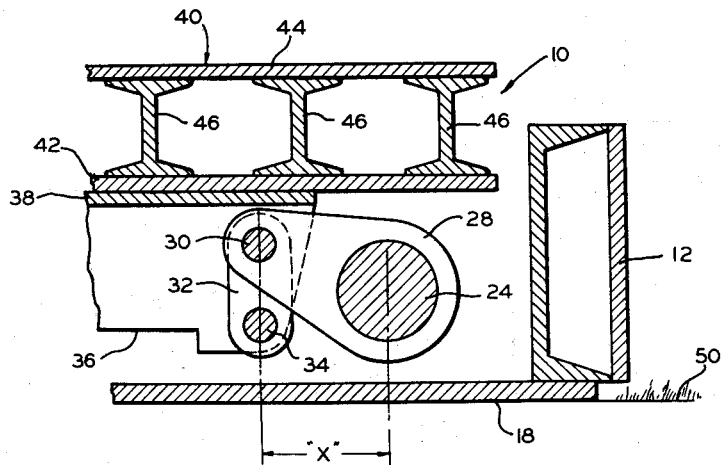
Figure 8:
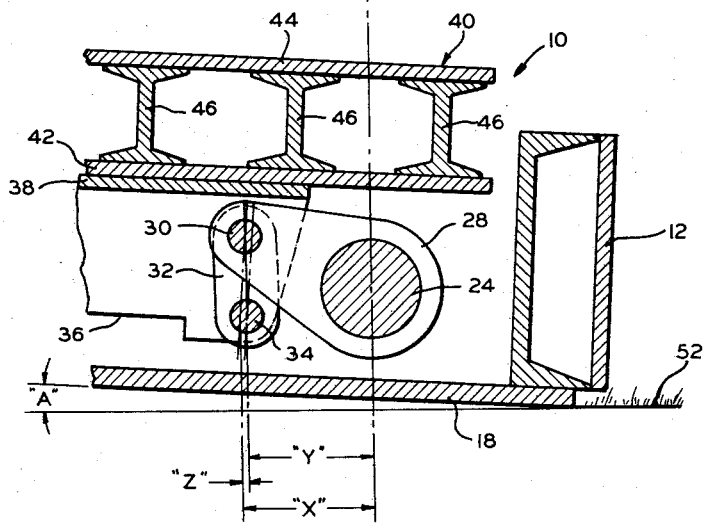

FIGURE 7 is a fragmentary cross-sectional view taken substantially along the line 7—7 of FIGURE 6 and shows the general arrangement and relationship of the torque transmitting linkage when the weighing device is set up for operation on a surface which is substantially level and horizontal;

FIGURE 8 is a fragmentary cross-sectional view taken along the same line as FIGURE 7 and shows the general arrangement and relationship of the torque transmitting linkage when the weighing device is set up for operation on a surface which is inclined somewhat from the horizontal, and diagrammatically illustrates the manner in which the effective moment arm of the lever is varied so as to provide a self-conmpensating linkage;

FIGURE 9 is a schematic wiring diagram of the weighing device showing the manner in which the strain gages may be interconnected to form the arms of a bridge circuit; and FIGURE 10 is a simplified showing of the bridge circuit formed by the general arrangement of FIGURE 9.

Figure 1:
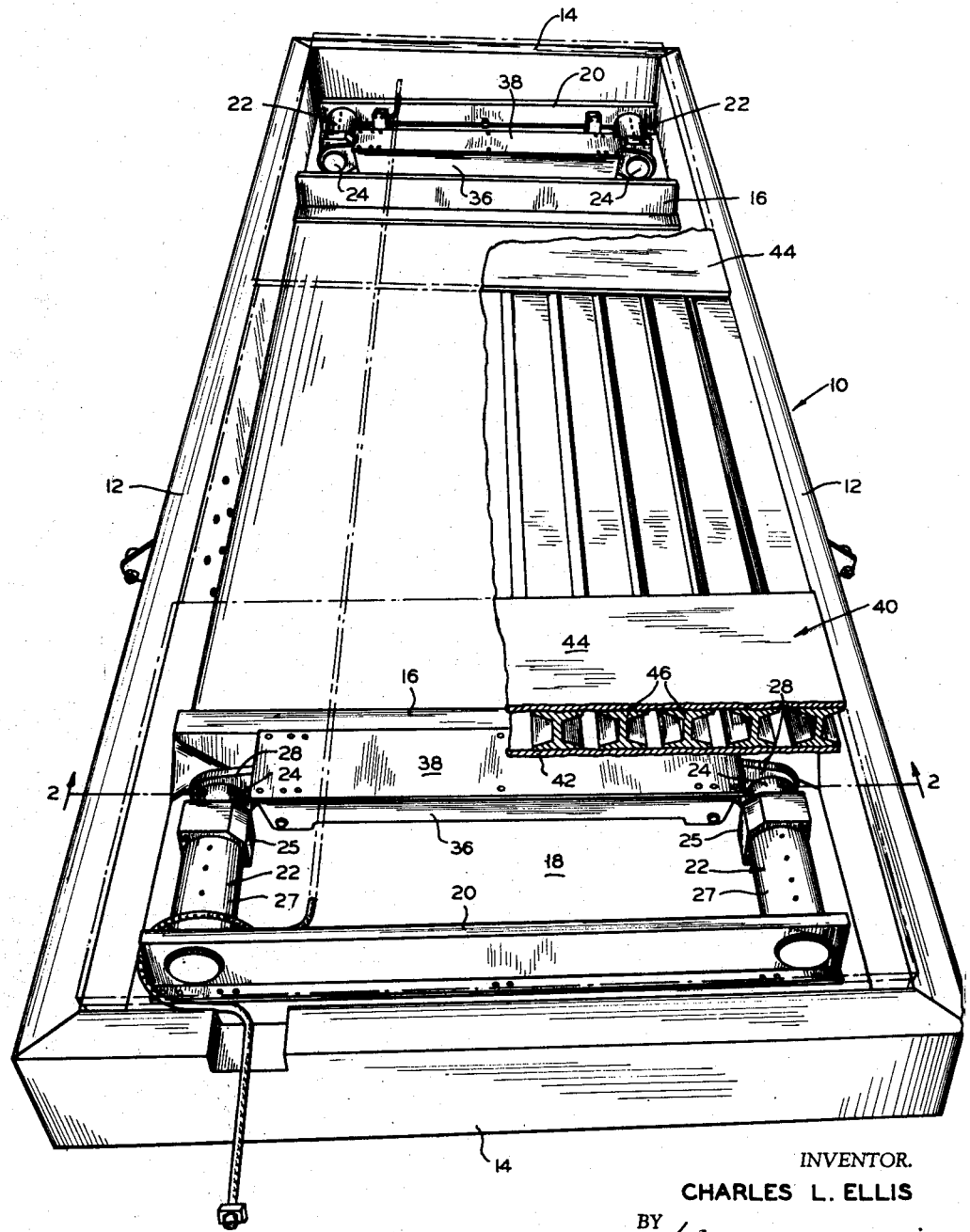
FIGURE 1 is a top perspective view of a portable weighing device embodying the structure and arrangement of the present invention with portions thereof being broken away more clearly to show certain of the structural elements and their relationship one to another.
Figure 2:
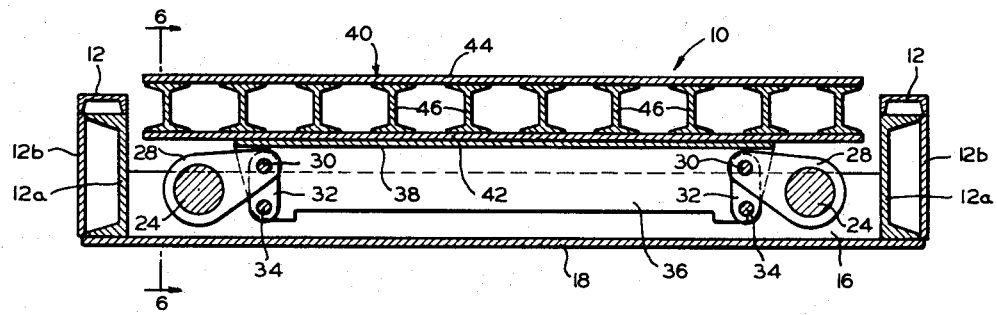
FIGURE 2 is a transverse cross-sectional view through the portable weighing device substantially as seen along the line 2—2 of FIGURE 1.

Referring now to the drawing, there is shown in FIGURE 1 a portable weighing device or scale generally indicated by the reference numeral 10. The scale 10 includes a generally rectangular outer frame made up of a pair of longitudinal stringer members 12 joined together at their ends by transverse frame members 14. The frame members 12 and 14 may be constructed in any suitable manner and of any suitable material, but they are preferably formed of high strength structural aluminum shapes such as the channel shaped configuration 12a shown in FIGURE 2 which is closed at the open side thereof by a plate 12b to form a rigid box-like member. The members 12 and 14 may be secured together, conveniently by welding, to form a rigid unitary frame for enclosing the other structural elements of the scale 10. Intermediate the ends thereof, the frame may be provided with additional transverse frame members 16, as desired to give added strength and rigidity thereto. The bottom of the frame may be either totally or partially enclosed as desired by means of one or more base plates 18 secured thereto conveniently by welding.

Figure 3:
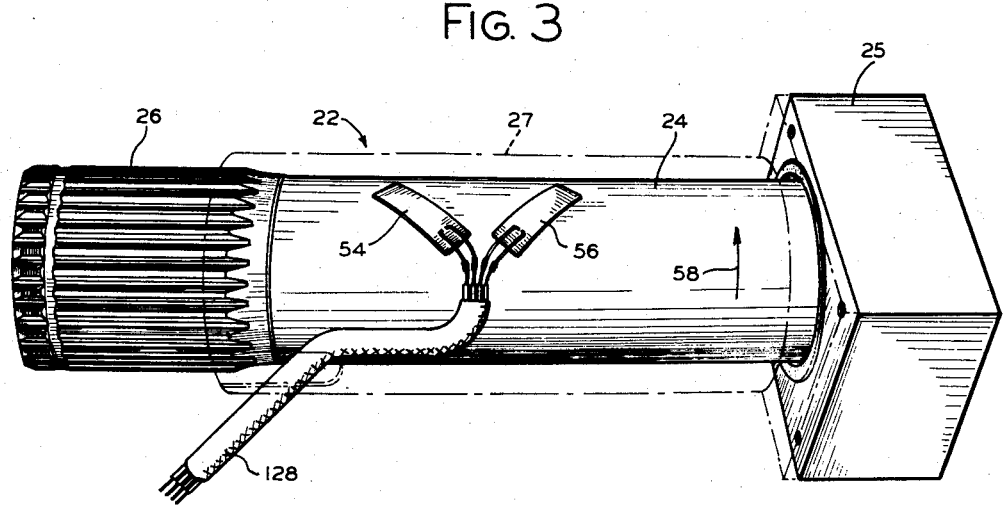
FIGURE 3 is an enlarged perspective view illustrating the structure and arrangement of one of the torsion members and showing the manner in which the filament type strain gages are assembled thereto.

Enclosed within the frame of the scale 10 adjacent each end thereof and conveniently secured thereto such as bolts to the base plates 18 is a support 20. Mounted upon the supports 20, adjacent each end thereof are torsion members generally indicated by the reference numeral 22. As best seen in FIGURES 3 and 6, the torsion members comprise a cylindrical shaft 24 having an enlarged end portion formed with mulitple external splines as at 26. The supports 20 are formed with suitable apertures having meshing internal multiple splines so as to support the ends of the shafts 24 in a manner to prevent rotation of the shafts relative to the supports 20.

At their opposite ends, each of the four shafts 24 have rigidly secured thereto, conveniently by welding, a lever arm 28 which projects inwardly toward the center of the scale 10 and slightly upwardly relative to the center of the shaft 24. The lever arms 28 are each provided with apertures adjacent the free ends thereof for the reception of pins 30 by means of which the lever arms 28 are pivotally connected to a pair of links 32 arranged on opposite sides of the lever arms 28. The links 32 normally project vertically downwardly and at their lower ends are pivotally connected as at 34 to a bifurcated brace member 36. The bifurcated brace members 36 are thus pivotally suspended at each end thereof by the links 32 and levers 28 from the shafts 24 of the torsional members 22. Intermediate the ends thereof, the shafts 24 are suitably supported within bearing blocks 25 which are suitably mounted upon the base plates 18 and suitable cylindrical cover elements 27 are provided about the shafts 24 which have a tight fit about the splined portion 26 and are flanged at one end thereof for mounting against the bearing blocks 25 to thereby form a weather resistant cover for purposes which will become apparent as the description proceeds.

The bifurcated brace members 36 have an enlarged top surface 38 each of which is adapted and arranged to support one end of a weighing platform generally indicated by the reference numeral 40. The weighing platform 40 comprises a pair of base plates 42 which are rigidly secured to the brace members 36 such as by bolting and a pair of top plates 44 with a plurality of high strength structural aluminum rails 46 therebetween and suitably secured to each of the plates 42 and 44 to form a rigid unitary structure. The top plates 44 may totally cover the entire length of the weighing platform 40 or they may only cover so much of each end as is necessary to form a supporting surface of such extent as will be required to receive the wheels of a vehicle thereon. Partial enclosure is preferable in the interest of eliminating unnecessary weight. Wherever practical, it is preferable that the structural elements of the scale be made of high strength aluminum in the interest of reducing the over-all weight of the scale 10 to render same more readily portable and to increase the weather resistance thereof.

As an example of the relative size and weight of a portable platform weighing device constructed in accordance with the above general description, such a unit has been constructed having a length of 12 feet, a width of 45 inches, and a height of 8 inches which, together with a trailer used for transporting same from place to place, weighs approximately one ton.

In operation, the scale 10 and its trailer are towed to the work site and the trailer is parked over a flat surface which need not be perfectly level since the scale is self-compensating as will appear presently. The scale is then deposited on the surface. If only a few units are to be weighed, the scale 10 can be set up as shown in FIGURE 5, wherein a pair of ramps 48 are set at each side thereof so that each unit can roll right up onto the platform. However, if a great number of units are to be weighed, it may be desired to install the scale 10 in a manner such as shown in FIGURE 4 by digging a shallow trench for reception of the scale so that the ramps 48 are not needed and thus considerably more time is ultimately saved than the little time required so dig the shallow trench.

Figure 4:
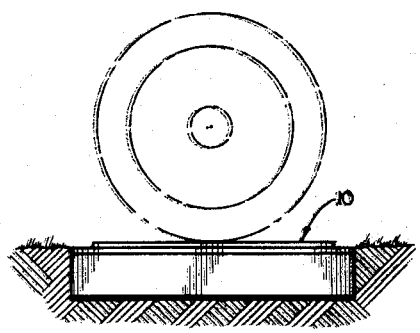
FIGURE 4 illustrates, on a reduced scale, the manner in which the weighing device of the present invention may be set up for use with the weighing platform at substantially the same grade level as that over which the loaded vehicles may be traveling.
Figure 5:
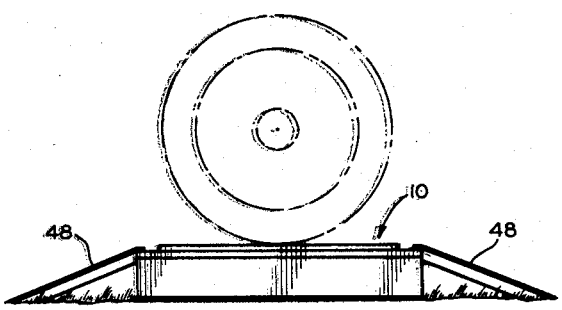
FIGURE 5 is a view similar to FIGURE 4, but illustrates the manner in which the weighing device of the present invention may be set up for weighing vehicles without requiring the device to be installed below the grade level over which the loaded vehicles may be traveling.

When the weight of a unit is on the weighing platform 40 as indicated by the dotted line showing of the wheels and axles in FIGURES 4 and 5, the weighing platform 40, by means of the connecting links 32, exerts a downward pull on the lever arms 28 which results in a certain amount of twisting in the torsion shafts 24 which deflect previously calibrated strain gages and produce an instrument reading of the weight on the platform 40 directly in pounds. The examplary scale, above mentioned, although being relatively light in weight is capable of supporting and accurately weighing loads up to 100,000 pounds. The arrangement and operation of the aforementioned strain gages is described hereinafter.

Referring to FIGURE 7, it may be seen that when the scale 10 is supported upon a level surface such as represented by the horizontal line 50, the suspension of the weighing platform 40 through the links 32 is such that the weight on the platform 40 exerts a force through the lever arms 28 tending to twist the shafts 24 and such force has an effective moment arm equal to the distance X from a line through the center of shaft 24 to a line through the center of the pivotal connections of the links 32. On a level surface, therefore, the effective moment arms through which the force acts is equal upon all four shafts 24.

When the scale 10 is set up on a surface which is inclined from the horizontal, such as shown in FIGURE 8 where, for example, the inclined surface 52 is at an angle A from the horizontal, the weighing platform 40 will shift slightly laterally within the frame until the links 32 depend vertically. The linkage suspension of the weighing platform 40 is essentially a parallelogram arrangement such that the pivot point 34 of the link 32 which is shown in the drawing will shift laterally toward the shaft 24 an amount equal to the distance Z and the effective moment arm through which the force acts will be equal to the distance Y. At the same time, the pivot point 34 of the linkage at the opposite end of the brace member 36 will shift laterally away from the shaft 24 an amount equal to the same distance Z. The effect is, therefore, such that the moment arm of the force acting on one of the torsion shafts 24 is decreased, whereas, the moment arm of the force acting on the torsion shaft 24 at the opposite end of the brace member 36 is increased.

As above indicated, since the shafts 24 are subjected to torsion, a strain is placed on the outside fibers of such shafts. At right angles to the axis of the shafts the strain is in the nature of a shearing distortion and the same condition is true in the direction of the axis. At any angle between these two directions the fibers are in a state of extension or contraction, depending upon the direction of torsion and the direction of the fiber in question. The maximum strain of this kind in a circular shaft, such as the shafts 24, occurs at 45° to the axis thereof.

The present invention contemplates the provision of suitable means for measuring the amount of torsional strain placed upon the fibers of the shafts 24 and further means for translating the strain measurement into pounds of weight upon the weighing platform 40. To that end, each of the shafts 24 as shown in FIGURE 3 may be provided with a pair of strain gages 54 and 56 of known type which comprise strain sensitive filaments and which are placed upon the surface of the shafts at an angle, preferably 45 degrees, to the axis thereof. The strain sensitive filaments are suitably bonded to but electrically insulated from the shafts and under a load as when the shaft 24 is subjected to torsion the fibers thereof tend to change in dimension slightly, causing the wire of the strain gage to stretch or compress. For example, let it be assumed that the shaft 24 shown in FIGURE 3 is subjected to a torsional force tending to twist it in the direction of the arrow 58. The strain gage 54 is thus placed in a state of compression and the strain gage 56 is placed in a state of tension. The cross-sectional area of the wire filament is changed by the tension or compression and the electrical resistance thereof is thereby increased or decreased. The wires of the strain gages carry an electric current so that the change in resistance causes a change in the voltage drop thereacross. The voltage change may be transmitted, as will presently appear, to a weight indicating electric instrument. The strain gages 54 and 56 are capable of response to large forces over a wide range and have the ability to function without appreciable actual displacement except for the slight dimensional change noted. Such strain gages are readily available and one type which has been found satisfactory is shown in Patent 2,292,549.

Referring now to FIGURE 9 of the drawing, there is schematically shown an arrangement of electrical circuitry for a weighing scale 10 constructed in accordance with the present invention. A suitable electrical power source such, for example, as indicated by the schematic representation of a storage battery at 60 provides a source of current for the circuit through power conductors 62 and 64. For purposes of clarity in the following description, the four torsional shafts are designated 24A, 24B, 24C and 24D, and the strain gages are correspondingly designated 54A, 54B, 54C, 54D and 56A, 56B, 56C and 56D.

Tracing the current flow in the circuit from the battery 60, it may be seen that the current will flow through the conductor 62 to a conductor 66 and thence to one terminal 68A of a terminal strip 68 from whence it is directed by means of a conductor 70 to the strain gage 54D and then by means of a conductor 72 to a terminal 68B of the terminal strip 68. The current flow from conductor 66 is also directed by means of a jumper conductor 74 from terminal 68A to a terminal 68C and thence through a conductor 76 to the strain gage 56D and then through a conductor 78 to a terminal 68D.

The current flows from terminal 68B through a conductor 80 to one terminal 82A of a terminal strip 82 from whence it is directed by means of a conductor 84 to the strain gage 56B and then through a conductor 86 to a terminal 82B. The current also flows from terminal 68D through a conductor 88 to a terminal 82C of the terminal strip 82 and thence through a conductor 90 to the strain gage 54B and then through a conductor 92 to a terminal 82D. There is thus established a parallel connection through the strain gages 54D and 56B and through the strain gages 56D and 54B from the common terminal 68A.

From the terminal 82B the current flows through a conductor 94 to one terminal 96A of a terminal strip 96 and thence through a conductor 98 to the strain gage 56A and then through a conductor 100 to a terminal 96B. The current from terminal 82D flows through a conductor 102 to a terminal 96C and thence by means of a conductor 104 through the strain gage 54A to a conductor 106 and a terminal 96D.

Completing the circuit, the current flows from the terminal 96B through a conductor 108 to one terminal 110A of a terminal strip 110 and thence by means of a conductor 112 through the strain gage 54C to a conductor 114 and a terminal 110B. In addition the current flows from the terminal 96D through a conductor 116 to a terminal 110C and thence by means of a conductor 118 through the strain gage 56C and through a conductor 120 to a terminal 110D. The terminals 110D and 110B are connected together by means of a jumper conductor or bus bar 122, and the terminal 110B is connected by means of a conductor 124, a terminal 96E, a conductor 126, and a terminal 82E with the power conductor 64 connected to the battery 60. The various conductors are preferably enclosed in suitable shielding such as indicated at 128 wherever possible between the terminal strips and the power source. The terminals 82B and 82D, being common connections to the strain gages are connected by means of conductors 130 and 132, respectively, to the terminals of a measuring device which may take the form of a galvanometer such as indicated at 134.

Considered in its elementary form the above described circuit forms a conventional Wheatstone bridge such as generally indicated at 136 in FIGURE 10. The voltage for the bridge 136 is impressed thereon from the battery 60 through the conductors 62 and 64 to the common connections 74 and 122 corresponding to the jumper conductors or bus bars described above. The unbalance of the bridge 136 is measured by the galvanometer 134 through the conductors 130 and 132 which are connected to the common terminals 82B and 82D as above described.

It is important to note that the set of strain gages 54D and 56B are connected together in series to form one arm 138 of the bridge 136, while similar set of strain gages such as 56A and 54C; 56C and 54A; 54B and 56D are, respectively, connected in series to form the remaining arms 140, 142 and 144 of the bridge 146. Each arm of the bridge 136 is thus composed of two strain gages which are located on separate torsion shafts at the same end of the weighing device and subjected to a similar distortion. As a result of this arrangement the two strain gages forming each of the arms of the bridge are located in the bridge so that all of the strain gages in opposite arms, such as the arms 138 and 142, are in tension; while all of the strain gages in the other opposite arms such as the arms 140 and 144 are in compression. Hence, in response to a torsional strain upon the torsional shafts 24, the resistance of arms 138 and 142 increases while the resistance in the arms 140 and 144 decreases. Thus, a high degree of sensitivity is obtained with comparatively short shafts 24. As a result of this arrangement the resistance change is twice as great as that which would be obtained with, for example, only one strain gage in each arm of the bridge. Another advantage of this arrangement is that it provides a compensation for bending in the torsion bars or shafts; any such bending during operation affects both of the strain gages on one of the torsion bars in a manner such that any variations produced by such bending cancel each other. A further advantage of the present arrangement of the torsion bars and strain gages thereon is that it provides temperature compensation both for the strain gages on the individual torsion bars and also among the plurality of torsion bars in the weighing device. It has been found that this last feature is particularly valuable in preventing any "drift" of the zero point of the indicating or recording instrument during a single weighing operation or group of weighing operations even though parts of the scale may be subjected to different temperatures or even to changes in temperature.

It was stated hereinbefore that the instrument 134 is a galvanometer, and such an instrument offers a simple, direct and accurate means of measuring the unbalance of voltage across the bridge 136. A null balance potentiometer has also been used satisfactorily for this purpose, and it will be understood that other indicating or recording instruments may be used if desired without departing from the present invention. Hereinafter, the device 134 is referred to merely as an instrument. The characteristics of instrument 134 can be determined from the known characteristics of the strain sensitive wire within the strain gages and from the size and modulus of the shafts 24. When a known torque is applied to the shafts 24, the instrument 134 can be calibrated very accurately and the scale thereof may readily be adapted to read the total weight in pounds corresponding to the change in resistance or voltage drop in the bridge 136. It has been found that with the present weighing device little attention is necessary in the field in preparation for weighing. It is necessary only to set the instrument 134 to zero by inserting a resistance of known value across one leg of the bridge and then adjusting the battery or other source of voltage until the instrument reads the amount which is known to correspond with such value of resistance. Thereafter, weight readings can be taken for a considerable period without further attention to the scale.

No special skill is required in the operation of this weighing device, its structure and operation being far simpler and its cost less than any other known combination of elements capable of giving the desired measurements at comparable accuracy. Instantaneous readings are obtained from the instrument 134 and, therefore, no delay is involved in obtaining a series of readings in rapid order.

It is further important to note that since the instrument 134 in effect measures the total resistance change or voltage unbalance of the bridge 136 it is not necessary to be concerned about distribution of the load upon the weighing platform 40. This weighing device is accurate even though the load is badly unbalanced on the weighing platform. This feature plus the self levelling feature previously described which results from the arrangement of the torsion bars, lever arms and links, along with the temperature and bending compensation features provided by the arrangement of the torsion bars and strain gages, provides a weighing device of such accuracy and versatility that it has many uses in the field and in stationary installations as well. Moreover, the present inventon provides a platform weighing scale which is readily portable because of its compact size and low weight, and it can conveniently be transported by means of a two-wheeled trailer towed behind a small truck or an automobile.

A series of tests have been conducted with a scale constructed in accordance with the present invention and in forty separate tests, the scale weighed predetermined steel weights and was exactly on the mark in thirty-two out of the forty. The maximum error of the remaining eight was only 1.33 percent; thus, the scale of the present invention is very accurate.

The scale of the present invention is direct reading. When a weight is placed on the weighing platform 40, the platform pushes down on the links 32 attached to the lever arms 28. The torsion shafts 24 twist a certain amount and distort the strain gages 54 and 56 resulting in a deflection of the previously calibrated instrument 134 which reads the weight directly in pounds if desired. When the weight is removed from the weighing platform 40, the instrument indicator goes right back to zero. Thus, there is no lag in the mechanism and no delay in weighing, for example, a series of vehicle axle loads. Only about one minute is needed to weight the two axles of a vehicle and to add the figures and subtract the dead-weight of the vehicle to thereby obtain an accurate figure corresponding to the actual load of the material being carried by the vehicle.

As previously mentioned, the electrical conductors are enclosed within suitable shielding 128. Each of the torsional shafts 24 is also provided with the previously mentioned cover element 27 (FIGURE 3) through which the shielded conductors may pass for attachment to the strain gages 54 and 56. The structure is thus such that the scale can be used in the open under severe weather conditions without affecting the operation or accuracy thereof which is an important consideration.

It will be apparent to those familiar with such mechanisms that the weighing device of the present invention involves a far simpler lever mechanism than has been possible heretofore, which mechanism has a minimum number of parts and which eliminates the requirement of extremely accurate and expensive knife edge supports, and which is considerably more durable and trouble free thereby requiring a minimum of service and maintenance.

It will, of course, be understood that while the invention has been described in the foregoing by way of reference to a particular preferred embodiment thereof, various changes in details of construction and arrangement of parts may be made by those skilled in the art without departing from the invention. For example, it is possible, if desired, to employ three or more torsion members adjacent each end of the weighing device instead of only two at each end as described and illustrated herein. In such a case, the strain gages on the torsion members are connected in a bridge circuit in a manner such that all of the tensional strain gages at one end are in one arm of the bridge and all of the tensional strain gages at the other end of the scale are in the opposite arm of the bridge, while all the compressional strain gages at the one end of the scale are in a third arm of the bridge and all of the compressional strain gages at the opposite end of the scale are in the fourth arm of the bridge. It is intended to cover by the appended claims all such modifications which fall within the true spirit and scope of the present invention.

I claim:

1. A weighing device comprising a generally rectangular frame having base plate means rigidly secured thereto, a generally rectangular load receiving platform disposed within said frame, four torsion members supported on the said base plate means within and adjacent the respective corners of said frame, four levers rigidly secured to the four said torsion members respectively, link means pivotally connecting said levers and said load receiving platform whereby a load on said platform exerts a torsional strain on said torsion members, and strain gages mounted on said torsion members for measurement of the strain on the outside fibers thereof as a determinant of the magnitude of the load on the said load receiving platform.

2. A weighing device comprising a generally rectangular frame having base plate means rigidly secured thereto, a generally rectangular load receiving platform suspended substantially wholly within said frame, a torsion member supported on the said base plate means within and adjacent each corner of said frame, lever means rigidly secured to each torsion member, link means pivotally interconnecting said lever means and said load receiving platform, and filament type strain gages mounted on said torsion members, whereby a load applied to said load receiving platform is transmitted through said link means and said lever means to exert a torsional strain on said torsion members and said strain gages are adapted and arranged for measurement of the strain thereof as an index of the magnitude of the load applied to said load receiving platform.

3. A weighing device of the character described, comprising frame means, base plate means rigidly secured to the said frame means, load receiving means, a plurality of torsion members having their one ends rigidly secured to said base plate means, lever means rigidly secured to the opposite ends of said torsion members, link means having one end thereof pivotally attached to said lever means and the opposite ends thereof pivotally attached to said load receiving means whereby said load receiving means is suspended within said frame means, and strain sensing means mounted on said torsional members for measurement of the torsional strain on the outside fibers thereof as a determinant of the magnitude of the load applied to said load receiving means.

4. A weighing device of the character described, comprising generally rectangular frame means, base plate means rigidly secured to the same frame means, load receiving means, a plurality of torsion members having their one ends rigidly secured on the said base means adjacent each corner of said frame means, lever arms rigidly secured to the opposite ends of each of said torsion members, said lever arms extending inwardly in horizontally disposed position in opposed pairs adjacent opposite sides of said frame means, generally vertically extending link means pivotally attached to said lever arms and to said load receiving means whereby said load receiving means is laterally shiftably suspended by said lever arms so as to be responsive to tilt of said frame means to vary the effective moment arms between said lever arms and said torsion members.

5. A weighing device of the character described, comprising generally rectangular frame means having base plate means rigidly secured thereto, load receiving means, a plurality of torsional members having their one ends rigidly secured on the said base plate means adjacent each corner of said frame means, lever arms rigidly secured to the opposite ends of each of said torsion members and arranged in confronting opposed pairs adjacent opposite sides of said frame means, and means for laterally shiftably suspending said load receiving means upon said lever arms whereby the effective moment arms between said lever arms and said torsional members are automatically varied to compensate for tilt of said frame means.

6. A weighing device of the character described, comprising a generally rectangular frame means having base plate means rigidly secured thereto, load receiving means, a plurality of torsionally resilient torsion members rigidly secured on the said base plate means adjacent each corner of said frame means, lever means adapted and arranged to suspend said load receiving means relative to said torsion members whereby a load applied to said load receiving means exerts a torsional strain on said torsional members, strain sensing means mounted on said torsion members, and indicating means cooperating with said strain sensing means for measurement of the load applied to aid load receiving means.

7. A weighing device comprising a generally rectangular frame having four upstanding side and end portions, base plate means rigidly secured to the said rectangular frame, a generally rectangular load receiving platform nested within the said frame, brace means depending from the said load receiving platform, an even number of horizontally disposed elongated torsionally resilient torsion members disposed half adjacent one end of the said frame and half adjacent the other end of said frame, said torsion members being disposed longitudinally of the said frame and having their outer end rigidly secured on the said base plate means, lever arms rigidly secured to the opposite ends of each of the said torsion members, such lever arms extending in horizontally disposed arrangement, vertically disposed link means pivotally attached to said lever arms and to said brace means, the connections of the said link means to the said brace means being below the connections of the link means to the said lever arms whereby said platform is suspended by said lever arms in laterally shiftable position so as to be responsive to tilt of said frame to vary the effective moment arms between said lever arms and said torsion members.

8. A weighing device of the character described, comprising frame means including a flat horizontally disposed portion, load receiving means including a flat horizontally disposed portion positioned above and in parallel relation to the said horizontally disposed portion of the frame means, a plurality of individual weight sensing devices located on the said horizontally dispossed portions of the frame means between the said horizontally disposed portion of the frame means and the said horizontally disposed portion of the load receiving means depending pivotable link means connecting the said load receiving means to the said weight sensing devices, and electrical means responsive to all of the said weight sensing devices for determining the magnitude of a load on the said load receiving means.

9. A weighing device comprising a generally rectangular frame having four upstanding side and end portions, a base plate rigidly secured to the bottom of said rectangular frame, a rectangular load receiving platform nested within the said frame near the top of the said side and end portions, a pair of brace members secured to the bottom of the said load receiving platform and depending therefrom, the said brace members being positioned transversely of the said platform and located respectively adjacent the ends thereof, four horizontally disposed elongated torsionally resilient torsion members disposed two adjacent respectively the corners at one end of the said frame and two adjacent respectively the corners at the other end of the said frame, said torsion members being disposed longitudinally of said frame and having their outer ends rigidly secured to the said base plate, four lever arms rigidly secured respectively to the opposite ends of the said torsion members, such lever arms extending in horizontally disposed arrangement toward the longitudinal center of the said load receiving platform, vertically disposed link means pivotally connected to said lever arms and to the said brace members respectively, the lever arms at one end of the said load receiving platform being connected to one brace member and the lever arms at the other end of the load receiving platform being connected to the other brace member, the connections of the said link means to the said brace members being below the connections of the link means to the said lever arms whereby said platform is suspended by said lever arms in laterally shiftable position so as to be responsive to tilt of said frame to vary the effective moment arms between said lever arms and said torsion members.

References Cited in the file of this patent

UNITED STATES PATENTS 1,759,885    Bousfield _____ May 27, 1930

(Other references on following page)

| | | |
|---|---|---|
| 2,292,549 | Simmons | Aug. 11, 1942 |
| 2,392,293 | Ruge | Jan. 1, 1946 |
| 2,447,566 | Decker et al. | Aug. 24, 1948 |
| 2,499,033 | Oberholtzer | Feb. 28, 1950 |
| 2,641,460 | Larson | June 9, 1953 |
| 2,736,549 | Paul | Feb. 28, 1956 |
| 2,838,299 | Reiser et al. | June 10, 1958 |

FOREIGN PATENTS

| | | |
|---|---|---|
| 61,946 | France | Dec. 15, 1954 |
| | (First addition to No. 1,019,561) | |
| 66,344 | France | Feb. 22, 1865 |

OTHER REFERENCES

Product Engineering, July 1945, page 449.